Patented July 10, 1951

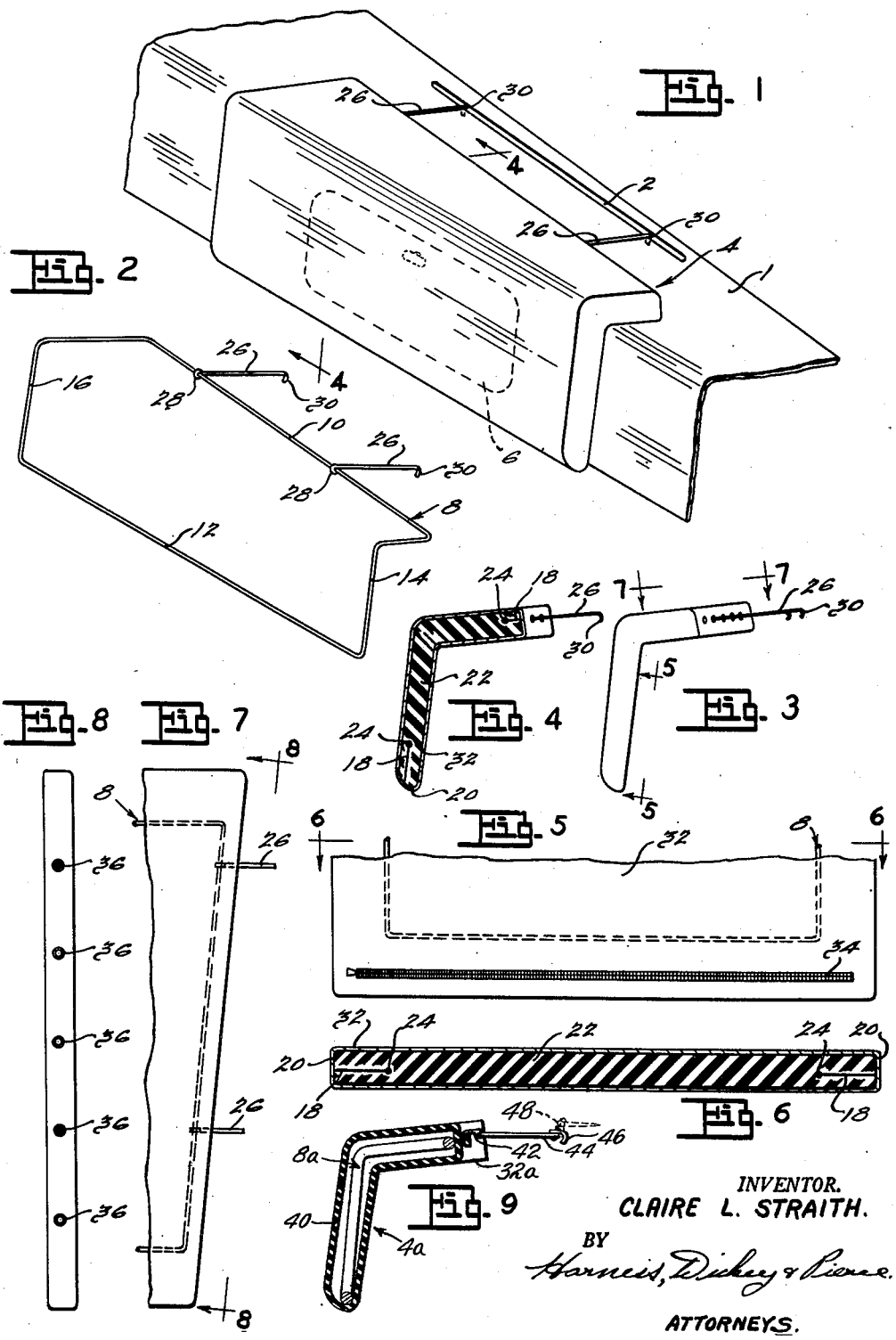

2,560,009

UNITED STATES PATENT OFFICE 2,560,009

AUTOMOBILE CRASH PAD

Claire L. Straith, Detroit, Mich., assignor to Virginia Straith Jeffries, Richard E. Straith, Dorothy Straith Diefenbach, and William M. Straith Application July 2, 1947, Serial No. 758,555

14 Claims. (Cl. 280—150)

This invention relates generally to automobile crash pads and more particularly to a crash pad which may be easily secured to cover at least a portion of the instrument panel of a motor vehicle and is an improvement over that described and claimed in United States Letters Patent Nos. 2,070,760 and 2,091,057 dated February 16, and August 24, 1937, respectively. In those patents there was broadly disclosed a crash pad for protecting persons riding in motor vehicles from facial injuries upon a sudden stop of the vehicle when travelling at high speed.

An object of this invention is to provide a new and improved crash pad for a motor vehicle instrument panel of the character described.

Another object is to provide such a crash pad which may be easily applied to a motor vehicle without alteration of the existing instrument panel.

Still another object is to provide such a crash pad which may be secured to the instrument panel by hooks or other suitable instrumentalities extending into or otherwise operatively engaged in the usual defroster slits.

A further object is to provide such a pad in which the parts are economical of manufacture and conveniently assembled and in which the parts may be replaced if damaged.

A still further object is to provide such a pad which may easily be disassembled for cleaning.

Further objects will be apparent from the drawings, the specification, and the claims appended hereto.

In the drawings:

Figure 1 is a perspective view of a portion of a motor vehicle instrument panel in which a crash pad has been attached in accordance with the teachings of the invention;

Fig. 2 is a perspective view of the frame member which supports the resilient pad;

Fig. 3 is an end view of the crash pad shown in Fig. 1;

Fig. 4 is a view taken substantially along the line 4—4 of Fig. 1 and looking in the direction of the arrows;

Fig. 5 is a view taken substantially along the line 5—5 of Fig. 3 and looking in the direction of the arrows;

Fig. 6 is a view taken substantially along the line 6—6 of Fig. 5;

Fig. 7 is a view taken substantially along the line 7—7 of Fig. 3 and looking in the direction of the arrows;

Fig. 8 is a view taken substantially along the line 8—8 of Fig. 7 and looking in the direction of the arrows; and Fig. 9 is a view similar to Fig. 4 showing a modified form of crash pad.

A resilient cushioning crash pad is provided in accordance with the present invention overlying the inner or rear face of the instrument panel in front of the guest passenger seat and extends well over the upper surface of the instrument panel. The pad is thus positioned so that in event the guest passenger is thrown forwardly, either through sudden application of the brakes or because of striking some object, and in such a manner as to cause the guest passenger's face to strike the instrument panel, the pad will cushion the shock and minimize any permanent damage, if not afford complete protection in all cases, to the face and head of the guest passenger.

In my prior patents above identified, the crash pads therein provided were arranged for permanent mounting and/or as a piece of original equipment built in the automobile. Automobile companies have been loath to adopt these crash pads for two reasons, one of which is the cost, and the other of which is that they do not wish to provide any equipment which is suggestive of the possibility of their products becoming involved in an accident which might permanently disfigure or otherwise injure an occupant. The form of my invention, shown and described in said patents above identified and applicable as an accessory to automobiles has been such as to require each pad to be individually shaped to each different model of instrument panel and to require installation by relatively skilled help, involving added cost.

It is therefore an important object of the present invention to provide a crash pad of the type described which is readily applicable as an accessory to the instrument panel of any conventional automobile, that may be applied to the instrument panel of such an automobile by persons as unskilled as the ordinary automobile owner, and which will not unnecessarily restrict the use of the conventional glove box which may be concealed thereunder in normal operation. To this end, the crash pad in accordance with the present invention is so formed and constructed as to enable it to be conformed to the particular shape and contour of the instrument panel of any conventional automobile to which it is wished to be adapted, and to enable it to be secured to such instrument panel in a simple and effective manner and in such a manner as to permit it to be readily moved to expose the door to the glove box when entry to the latter is desired.

In accordance with the present invention the crash pad may be formed from a suitable resilient yieldable material such as sponge rubber or the like of proper width and thickness and preferably provided with a metal reinforcing framing, or shape maintaining element or elements which may be readily bent by the purchaser to make the crash pad conform to the shape of the instrument panel of his particular make of car. Furthermore, it is provided with means capable of being readily engaged with the defrosting slot of such instrument panel for securing it in place upon the instrument panel. This latter means is preferably so constructed and arranged as to permit the pad to be pivoted upwardly thereby to expose the door of the glove box therebeneath.

In the broader aspects of the invention, the particular form and construction of the reinforcing and/or framing means may vary considerably as long as it is of such character as to be capable of being more or less readily bent to permit the pad to be brought into substantial or approximate conformance to the exterior face of the instrument panel over which it is adapted to lie, but in accordance with a narrower phase of the invention, a frame or reinforcement of a wire character has been found of unusual advantage not only because of its ability to answer the above requirements, but also because of its ease of application to the pad itself, and provides a ready means of adjustment of the securing means with respect to the defrosting slot, making it particularly valuable as accessory equipment.

The securing means itself may be of any suitable type but is preferably such as to permit the adjustment thereof along the cooperating edge of the crash pad so as to permit the position of the pad transversely of the instrument panel to be readily varied, and is preferably such as to permit it to be readily adapted to instrument panels wherein the distance of the defrosting slot from the rear or inner face of the panel varies between different makes of automobiles. One suggested form of connecting device which meets this last requirement includes two or more strips of webbing or the like secured to the crash pad and each having an end looped through a fastening member or device which may be readily secured to the instrument panel or other part immediately associated with it. Such member may be of readily bendable metal so as to enable it to be bent into a hook for engagement with the defrosting slot, or may be secured in place by one of the screws holding the windshield frame in place. In such case, the looped portion is preferably secured to the first mentioned portion by a longitudinally shiftable buckle element, or the like, such as, for instance, of the type employed for the shoulder straps of overalls, to permit adjustment of the effective length thereof. However, a simple wire hook element has been found to meet the above requirements and is therefore shown and described in the accompanying drawings and specification as the preferred form of such connection.

Referring to the accompanying drawing and particularly to Fig. 1, the instrument panel of a conventional automobile is fragmentarily shown at 1 and as provided with the usual slot 2 in the upper surface thereof for the passage of a stream of air from a conventional heater (not shown) to the rear face of the windshield (not shown) extending upwardly in a conventional manner from the forward edge of the panel 1, for the purpose of defrosting such windshield. That portion of the instrument panel shown is assumed to be that portion on the side of the body opposite the driver's seat, in front of the seat next to the driver's and in which seat the so-called guest passenger is usually seated.

In the particular form of construction shown and described in Figs. 1 to 8 inclusive, the crash pad 4 there shown includes a wire frame 8 in generally rectangular form with an upper horizontal portion 10, a lower horizontal portion 12 and side portions 14 and 16. The side portions 14 and 16 may be bent intermediate their ends if desired, as shown in Fig. 2, whereby the surface defined by the member 8 substantially corresponds with the portion of the instrument panel against which the pad 4 is to lie. The frame 8, being of wire, may be readily bent to adapt the pad 4 to the shape of the particular instrument panel to which it is to be applied and, further, serves as a frame or reinforcement for the pad. The frame 8 may be either completely or partially embedded within the periphery of the pad proper, indicated at 20, which is preferably formed of a suitable resilient and readily yieldable material. In some cases, at least, it may be desirable to leave the upper run 10 of the wire frame exposed outwardly beyond the corresponding edge of the pad 20 so as to provide more ready adjustment of the securing means therealong, but in the construction shown in the drawing by way of illustration, the frame 8 is completely embedded in the pad 20. In the form shown in Figs. 1 to 8 inclusive the pad 20 is of solid construction and is assumed to be of a suitable grade of sponge rubber. In accordance with a more limited phase of the invention, in order to reduce the cost of manufacture and permit for ready application of the frame 8 to the pad 22, the pad 22 is provided with a peripheral slit 18 in which the frame 8 is received. In order that the pad 20 may present a smooth appearance when placed on the frame, the inner end of the slit 18 is preferably enlarged as at 24 to substantially the cross-sectional area of the wire of which the frame 8 is fabricated so as to enable the wire to be received thereby without bulging the pad. With this construction, the pad and the wire frame may be formed separately and the frame thereafter quickly and readily worked into the slit 18 so as to effect an assembly of the two.

In the construction shown in Figs. 1 to 8 the connecting means between the crash pad and the instrument panel comprises a pair of wire members 26, one end of each of which is bent to form an eyelet 28 surrounding the top or upper horizontal portion 10 of the frame 8. The eyelets 28 are freely slidable longitudinally of the upper run 10 of the frame 8 thereby to provide for lateral adjustment of the pads on the instrument panel as will hereinafter be more apparent. The members 26 extend outwardly through the slit 18 forwardly and in the broader phases of the invention may terminate in an end adapted to be suitably and readily secured to the instrument panel or to an associated fixed part. For instance, they may be formed or bent for encirclement of one of the screws which hold the windshield frame in place, or some other convenient screw preferably, however, they terminate in hooked-shaped end portions adapted to extend downwardly into the defroster slot 2, thereby engaging the rear edges of the same to hold the pad in position upon the instrument panel. In practice, the outer ends of the wires 26 may be allowed to remain straight when sold, and may be bent by the purchaser at the proper position in the length thereof to engage the inner edge of the defroster slot 2 or a screw such as mentioned, to adapt it to the particular instrument panel with which his automobile is provided. The forwardly hooked ends of the wire 28 in engaging in the defroster slot 2 form, in effect, a pivotal connection between the pad and the rear edge of the slot 2 permitting the whole pad assembly to be readily pivoted upwardly about such rear edge of slot 2 to expose the glove compartment door 6 therebelow. Thus, when it is desired to gain access to the glove compartment, the rear edge of the pad 4 is simply lifted, causing it to pivot about either the hooks 30 or along the line of connection between the members 26 and the upper run 10 of the frame 8, and exposing the door 6 therebelow. When the desired article has been inserted in or removed from the glove box and the door 6 closed, the pad 4 is simply dropped and returns by gravity to its operative position.

To enhance the appearance of the pad 22, it is preferably enclosed in a suitable cover or envelope which may if desired be of a color or finish matching that of the instrument panel of which it is applied. Broadly speaking, the cover or envelope may be made of any suitable material and secured in place in any suitable manner, but is preferably made of material of suitable strength and properly fitted to the pad 22 to serve the further purpose of preventing the slit 18 opening up, thereby to provide a means for securing the pad 22 against disassembly from the frame 8. Preferably the envelope 32 is made from a material that may be readily cleaned and is preferably readily removable not only to permit such cleaning but also to enhance the ease of its assembly to the pad.

The envelope 32 is preferably closed by some suitable or conventional form of readily separable connection such as glove fasteners, snaps, a zipper or the like, which may be located wherever considered convenient, a zipper 34 being shown by way of illustration in the vicinity of the edge thereof adjacent the lower portion 12 of the frame 8 whereby the envelope 32 is snugly held to the exterior surface of the rubber sponge pad 22 and may easily be removed therefrom for cleaning.

Since the length of the defroster slot 2 may be different for vehicles of various manufacture, the edge portion of the envelope 32 adjacent the horizontal portion 10 of the frame 8 is provided with a plurality of spaced holes 36 through which the hook members 26 may be selectively inserted when the envelope 32 is placed over the pad 22.

In Fig. 9 there is shown a modified form of crash pad 4a in which an airtight casing 40 molded to the desired shape may be inflated through an inlet valve (not shown) such as are commonly used in football bladders. A wire or other readily bendable metal framing or reinforcing element or device 8a may be incorporated in the casing 40 if desired. The casing 40 is provided adjacent its upper edge portion with an eyelet member 42 molded thereinto. The members 42 receive an eyelet end of a preferably flexible strap or strip of webbing 44, which may be of the adjustable type previously mentioned, and which carries at its forward end a member 46 which may be formed into a hook engaged in the defroster slot 2. The end 46 may be of readily bendable metal and perforated so that instead of bending it into a hook for engagement with the defroster slot as shown in full lines, it may be bent upwardly as shown in dotted lines for reception of a screw, such as 48, which may, for instance, be employed for holding the windshield frame in place, or for some other use. Any number of members 42 may be provided and spaced as desired to provide the correct positioning for the members 44 whereby the portion 46 will be aligned with the slot 2. A washable envelope 32a may be used if desired.

What is claimed and is desired to be secured by United States Letters Patent is as follows:

1. An accessory of the character described comprising a resilient padlike member, a hollow shapable, frame member formed of relatively thin and narrow material extending peripherally around and substantially at the peripheral edge portion of said pad member and embedded therein and bendable to define a surface of the general shape of the section of a vehicle instrument panel with which it is adapted to be associated, a pair of hook members, said hook members having hooklike portions securing one end portion of said hook members to said frame member, said hook members each having another portion extending outwardly of said padlike member, said hook member other portions being angularly offset and adapted to extend into defrosting openings in the instrument panel.

2. A crash pad adapted to be supported on the instrument panel of a motor vehicle, a hollow metallic frame, a sponge rubber sheet of a width and length greater than the width and length of said frame and having a thickness greater than the thickness of said frame, said sheet having a continuous peripheral slot opening through the edges thereof and receiving said frame, said slot being arranged so that the inner dimensions thereof are substantially the dimensions of said frame, and an elongated member secured at one end portion to said frame and having holding portions positioned outwardly of said slot whereby said pad may be supported on said panel.

3. A crash pad adapted to be supported on the instrument panel of a motor vehicle, a metallic frame, a sponge rubber sheet of a width and length greater than the width and length of said frame and having a thickness greater than the thickness of said frame, said sheet having a continuous peripheral slot opening through the edges thereof and receiving said frame, said slot being arranged so that the inner dimensions thereof are substantially the dimensions of said frame, and elongated members having eyelet portions at one end thereof adapted to be pivotally and slidably connected to said frame member and having holding portions at the other end thereof positioned outwardly of said slot whereby said pad may be supported on said panel.

4. A crash pad adapted to be supported on the instrument panel of a motor vericle, a metallic frame, a sponge rubber sheet of a width and length greater than the width and length of said frame and having a thickness greater than the thickness of said frame, said sheet having a continuous peripheral slot opening through the edges thereof and receiving said frame, said slot being arranged so that the inner dimensions thereof are substantially the dimensions of said frame, elongated members having eyelet portions at one end thereof adapted to be pivotally and slidably connected to said frame member and having holding portions at the other end thereof positioned outwardly of said slot whereby said pad may be supported on said panel, and means enveloping said sheet and holding the edge portions of said slot against parting movement whereby said sheet is held by said frame.

5. A crash pad for the instrument panels of automobiles comprising, in combination, a pad of readily yieldable material, a hollow metal framing device formed of relatively thin and narrow metal sections lying solely adjacent the periphery of said pad and operatively associated therewith and controlling the shape thereof, said framing device being readily bendable whereby to enable said pad to be shaped to approximate conformity to the face of said panel over which it is adapted to lie, and securing means secured to the assembly of said pad and framing device and projecting therefrom for operative engagement with a portion of the vehicle adjacent the instrument panel.

6. A crash pad for the instrument panels of automobiles having a defroster slot therein comprising, in combination, a pad of readily yieldable material, a hollow metal framing device forming solely the peripheral outline of a contour similar to that of said pad and operatively associated therewith and controlling the shape thereof, said framing device being readily bendable whereby to enable said pad to be shaped to approximate conformity to the face of said panel over which it is adapted to lie, and securing means comprising a pair of wire elements having hooklike end portions at least partially encircling a portion of said framing device whereby they are laterally shiftably secured to said framing device, said elements projecting from said pad in spaced relation with respect to each other and provided with hooklike end portions adapted for hooked engagement with an edge of said slot for holding said pad in position upon said panel.

7. In combination, a vehicle instrument panel located adjacent the windshield of the vehicle and having an opening therethrough for the passage of air adjacent the windshield, an inflated rubber-like pad shaped in general conformity to the shape of a portion of said panel adjacent said opening, and attaching means pivotally secured to said pad and adapted to be received in said opening whereby said pad is held against said panel.

8. For use with a vehicle instrument panel located adjacent the windshield of the vehicle and having an opening therethrough for the passage of air adjacent the windshield, a resilient material pad adapted to overlie a portion of the panel, a semi-rigid member readily bendable to the general shape of said panel portion, means attaching said member to said pad whereby the shape of said pad is determined by the shape to which said member is deformed, and supporting members, said supporting members and said semi-rigid member having interfitted and mutually overengaging coupling slide portions to provide for longitudinal adjustment whereby said panel portion may be randomly selected with respect to said panel opening, said means having a portion spaced from said member adapted to be received in said opening whereby said pad is held against said panel portion.

9. The combination of claim 8 in which said supporting member has a hook portion pivotally secured for rotation on said semi-resilient member.

10. A crash pad for the instrument panels of automobiles having a point adjacent thereto to which securing means may be attached comprising, in combination, a pad of readily yieldable material, a metal framing device made of elongated stock and arranged to define the periphery of a polygon and contained within said pad solely adjacent its periphery and controlling the shape thereof, said framing device being readily bendable whereby to enable said pad to be shaped to approximate conformity to the face of a portion of said panel over which it is adapted to lie, said pad having an elongated slit along one edge thereof, and securing means formed for operative engagement with the adjacent point and extending through said slit and slidably secured to said device whereby it is transversely shiftably secured to the assembly of said pad and framing device so that said panel portion may be readily selectable relative to said adjacent point.

11. An accessory for a motor vehicle having an instrument panel comprising, a resilient padlike member having a recess adjacent one peripheral edge, a wirelike frame having a first elongated section received within said recess and having a pair of spaced side members extending outwardly of said section and within said resilient member whereby said frame side members are covered by said resilient member, said frame side members being readily shapable to substantally conform to the shape of a portion of said panel whereby said resilient member will be held in substantial conformity to the shape of said portion.

12. The combination of claim 11 in which means is provided for attaching said accessory to the panel.

13. The combination of claim 12 in which said attaching means comprises a flexible elongated member extending outwardly of said resilient member and provided with an attaching member attachable to the vehicle adjacent said panel portion.

14. The combination of claim 11 in which said frame is a closed polygon of the same contour as that of said resilient member and is positioned adjacent the periphery of but within said resilient member.

CLAIRE L. STRAITH.

REFERENCES CITED

The following references are of record in the file of this patent:

UNITED STATES PATENTS

| Number | Name | Date |
|---|---|---|
| 2,032,711 | Moles | Mar. 3, 1936 |
| 2,070,760 | Straith | Feb. 16, 1937 |
| 2,091,057 | Straith | Aug. 24, 1937 |
| 2,375,567 | Luton | May 8, 1945 |
| 2,436,461 | Tritt et al. | Feb. 24, 1948 |